United States Patent [19]

Vonk

[11] Patent Number: 5,045,139

[45] Date of Patent: Sep. 3, 1991

[54] PROCESS FOR THE PRODUCTION OF A PICTUREPOSTCARD

[75] Inventor: Wybe J. K. Vonk, London, England

[73] Assignee: Chubasco N. V., Curacao, Netherlands

[21] Appl. No.: 362,369

[22] Filed: Jun. 5, 1989

[51] Int. Cl.[5] .............................................. B32B 31/00

[52] U.S. Cl. .................................... 156/152; 156/249; 156/267; 156/270; 156/289; 156/344

[58] Field of Search ............... 156/267, 264, 261, 303, 156/299, 302, 552, 522, 313, 249, 268, 518, 297, 298, 152, 247, 269, 303, 301, 270, 289; 428/40

[56] References Cited

U.S. PATENT DOCUMENTS

| | | | |
|---|---|---|---|
| 3,051,604 | 8/1962 | Andrews | 156/152 |
| 3,621,195 | 11/1971 | Goldstein | 156/579 X |
| 3,840,420 | 10/1974 | Sarcia | 156/358 |
| 3,933,564 | 1/1976 | Jensen | 156/302 X |
| 4,153,496 | 5/1979 | Swift | 156/269 X |
| 4,285,754 | 8/1981 | DiMatteo | 156/264 |
| 4,778,551 | 10/1988 | Coffman | 156/267 |
| 4,786,342 | 11/1988 | Zellner et al. | 156/261 X |

FOREIGN PATENT DOCUMENTS

| | | |
|---|---|---|
| 0246740 | 11/1987 | European Pat. Off. . |
| 578287 | 6/1933 | Fed. Rep. of Germany . |
| 2588214 | 4/1987 | France . |
| 8204058 | 5/1984 | Netherlands . |

OTHER PUBLICATIONS

Mansion, J. E., *Harrap's New Standard French and English Dictionary*, Harrap, London: 1972, p. A15.

Rey, A. et al.; *Le Petit Robert*, Le Robert: Paris; p. 24.

*Primary Examiner*—David A. Simmons
*Assistant Examiner*—Chester T. Barry
*Attorney, Agent, or Firm*—Dennison, Meserole, Pollack & Scheiner

[57] ABSTRACT

A picture postcard is produced from a continuous web having a layer of adhesive on each surface thereof. A picture layer is adhered to one surface of the web and a support layer is adhered to the other surface of the web to form a postcard unit, and the postcard unit is subsequently cut out of the web.

4 Claims, 1 Drawing Sheet

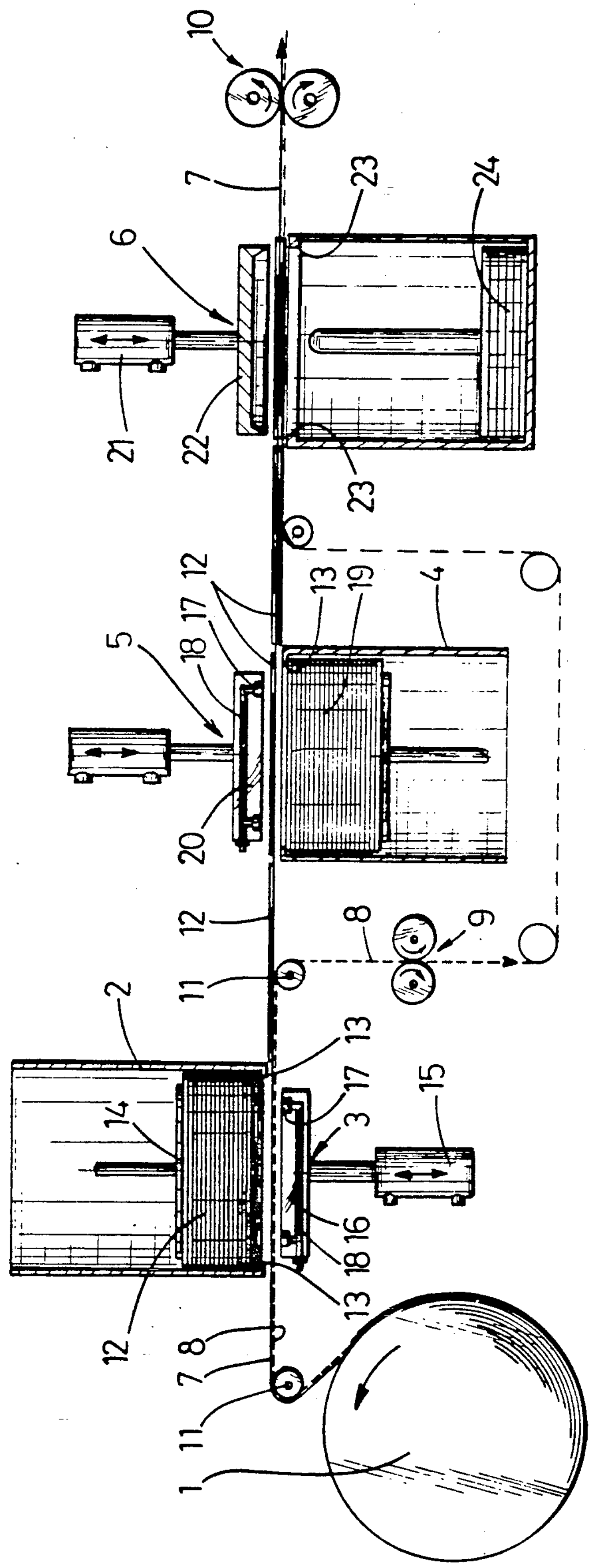
10
7
6
23
24
21
22
23
5
18
17
12
13
19
4
20
12
8
9
11
2
13
14
17
3
15
16
18
13
12
7 8
11
1

PROCESS FOR THE PRODUCTION OF A PICTUREPOSTCARD

BACKGROUND OF THE INVENTION

The invention relates to a process for the production of a picture postcard, comprising the provision of a support with an adhesive layer and the placing of a picture thereon. Such a process is known from EP-A-0,2468740. Here a protective film is applied to a support provided with an adhesive layer, and a transparent layer provided with an adhesive layer is applied thereto. A postcard with photograph is obtained by moving the support and the transparent layer apart at the place where the protective layer is provided and removing the protective layer, and then inserting a photograph and moving the support and the transparent layer towards each other. This process has the disadvantage that it is very complex, because it is necessary to provide a large number of layers. Besides, there is no guarantee at all that the photograph is going to be placed correctly relative to the support. Moreover, when the support and the transparent layer are being written on by hand and the protective layer is being removed a situation arises in which irregularities can easily occur.

FR-A-2,588,214 discloses a postcard comprising a support which has placed on it a double-sided bonding partion of material which is smaller than the dimensions of the support, and with a protective film placed thereon. After removal of the protective film, a photograph can be placed. The disadvantage here is that such a card is particularly difficult to produce, because starting from the support a smaller part of double-sided adhesive strip with protective film applied thereto has to be placed on it. The double-sided adhesive strip can never serve as the means of conveyance on which the support or picture is placed, following by the cutting out of the combination thus formed, as proposed according to the invention.

SUMMARY OF THE INVENTION

The object of the invention is to avoid these disadvantages. This object is achieved according to the invention by a process for the production of a picture postcard, comprising the provision of a support with an adhesive layer and the placing of a picture thereon is improved in that a double-sided adhesive strip is used as the adhesive layer, and the support and picture are placed on it, following which the card is cut out of the strip. Due to the fact that the adhesive layer is designed as a double-sided adhesive strip and is now used as a means of conveyance on which the support and picture are placed, it is now possible to produce postcards with pictures in a much simpler manner.

According to an advantageous embodiment of the invention, the double-sided adhesive strip is provided at one side with a removable protective film. Either the support or the picture is first placed on the part of the double-sided adhesive strip not provided with the protective film, the strip is then removed, following which the picture or the support is placed. In this way, the adhesive part of the strip is protected as long as possible. After the separation, the protective film can be fed in again at a later stage after the support or the picture are in place. This will be an advantage if the adhesive strip is broader than the support or picture, so that problems can occur when the strip is engaged for conveyance or cutting of the assembly to the final shape. Through the infeed of the protective film, problems with adhesion by the double-sided adhesive strip are avoided as far as possible.

The invention also relates to a device for carrying out the above-described process, comprising means for sticking the support and the picture on the double-sided adhesive strip, each comprising a holder for the support or the picture, said holders being placed on either side of the double-sided adhesive strip at different positions, viewed in the lengthwise direction of the adhesive strip, in such a way that a support or picture therein is present a short distance from the adhesive strip, and always a function element for bringing the supporrt or the picture into contact with the appropriate side of the double-sided adhesive strip. The conveyance of the double-sided adhesive strip can be carried out in many ways known in the state of the art, but it is preferable to use means for it which grip the support/strip/picture assembly by the edge.

The invention is explained in greater detail below with reference to the drawing, in which the sole FIGURE shows an example of an embodiment of a device for carrying out the process according to the invention.

DESCRIPTION OF A PREFERRED EMBODIMENT

The device shown in the FIGURE for producing picture postcards in principle comprises: a roller 1 with double-sided adhesive strip, a first holder 2, and a first function element 3 placed below said holder 2, and second holder 4, and a second function element 5 placed above it, and a cutting device 6.

The double-sided adhesive strip 7 wound on the roller 1 is initially provided on its underside with a protective film 8. When the double-sided adhesive strip 7 has passed the first holder 2 and the first function element 3, the protective film 8 is removed in a different direction from that of the direction of advance of the double-sided adhesive strip 7. Advance elements 9, shown only schematically, are used for this, their speed of conveyance essentially corresponding to advance elements 10 for the double-sided adhesive strip 7.

The drawing also shows a number of guide rollers 11 for the double-sided adhesive strip 7 and for the protective film 8. It is pointed out that the guidance of the double-sided adhesive strip 7 and the protective film 8 can take place in any suitable manner.

In the embodiment of the device shown, the holders 2 and 4 and the function elements 3, 5 are identical in design. Only the position and level of the holders 2, 4 and the function elements 3, 5 relative to the double-sided adhesive strip 7 are different. The functioning is, however, identical, so that a detailed description of the functioning of the holder 2 and the function element 3 will suffice.

The holder 2 is essentially rectangular in shape, the top and bottom being open. The holder 2 is shown only schematically with two side walls in the drawing. This holder 2 will, however, have four side walls in reality for the correct accommodation of supports or photographs 12.

At its end facing the function element 3, the holder has inward-directed fingers 13 which engage for a short distance under the edge of the bottom mounting or photograph respectively. The holder 2 is also provided with an element 14 forcing the stack of supports or photographs 12 in the direction of the function element 3. The force exerted by this weighting element 14 on the supports or photographs 12 must be set in such a way that the supports or photographs 12 are not pressed past the fingers 13.

The function element 3 comprises a pressure element 16 which can be moved to and fro by a cylinder/piston assembly 15 or the like. The pressure element 16 has, at its side which faces the holder 2, suction apertures 17 which can be connected by means of a duct 18 in a manner not shown in further detail to a vacuum source which can be switched on and off as desired.

It is possible for the holder 2 to have in it supports 12 which are provided with an address side, which faces upwards in the position shown. Such a support 12 is placed on the double-sided adhesive strip, as follows: The advance elements 10 and 9 are stopped, so that the double-sided adhesive strip 7 is stationary. The cylinder/piston assembly 15 is then actuated and the pressure element 16 moved upwards in the direction of the holder 2. The pressure element 16 will thereby engage with the side of the double-sided adhesive strip 7 which is provided with protective film 8 and will move this adhesive strip upwards until the free, bonding side of this adhesive strip 7 comes into contact with the bottom support 12. The forcing element 14 ensures a counter-pressure here, so that intimate contact takes place between the adhesive strip 7 and the support 12. As can be seen from the FIGURE, the bottom support 12 in the holder 2 is a short distance above the adhesive strip 7 when this adhesive strip 7 is not being gripped by the pressure element 16. This means that this pressure element 16 need be moved only a relatively short distance upwards for bringing the double-sided adhesive strip 7 into contact with the support 12.

The protective film 8 prevents the double-sided adhesive strip from sticking to the pressure element 16, which would be undesirable.

When the adhesion between the double-sided adhesive strip and the support 12 has taken place, the suction openings 17 are actuated, causing the double-sided adhesive strip 7 to be gripped forcefully (via the protective film 8) by the pressure element 16. If the cylinder/-piston assembly 15 is now moved in the opposite direction, the pressure element 16 is moved downwards, and the double-sided adhesive strip 7 with the support 12 adhering thereto is moved down. The edges of the support 12 are pulled past the fingers 13 here, following which the next support 12 situated above that comes to rest on said fingers 13. Finally, the suction apertures 17 are switched off, following which the double-sided adhesive strip 7 reaches the starting position and the support 12 is bonded to the top side thereof. The advance elements 9 and 10 are then restarted.

The advance elements 9 and 10 are actuated intermittently, so that the double-sided adhesive strip is advanced intermittently in its lengthwise direction. The adhesive strip 7 is always advanced so far by the abovementioned advance elements and the holder 2, the holder 4 and the cutting device 6 are placed in such a way that during a stationary period of the adhesive strip 7 these parts of the device can carry out their operations simultaneously on supports or photographs placed or to be placed in succession on the adhesive strip. So a considerable saving in time is realised.

After a support 12 has been placed on the top side of the double-sided adhesive strip 7 at the holder 2 and the function element 3, the protective film 8 is removed from the underside of the double-sided adhesive strip 7 by means of the advance elements 9.

The support 12 placed on the adhesive strip 7 then reaches the holder 4 and the function element 5. The holder 4 now has placed in it photographs 19, the picture side of which faces downwards in the FIGURE. As already explained earlier, the functioning of the holder 4 and the function element 5 corresponds to the functioning of the holder 2 and the function element 3. The only difference is that the support 12 already placed on the top side of the double-sided adhesive strip 7 now fulfils the same function as the protective film 8 at the holder 2 and the function element 3, namely preventing the double-sided adhesive strip 7 from sticking to the pressure element 20 of the function element 5.

After the second holder 4 and the second function element 5 have been passed, a support 12 and a photograph 19 are now placed on the opposite sides of the double-sided adhesive strip 7. This assembly then reaches the cutting device 6, which again is shown only schematically.

The cutting device 6 comprises a cutting knife 22 which is movable up and down by a cylinder/piston assembly 21. This cutting knife 22 works in conjunction with a counter-element 23, which at its bottom side is also designed as a collection container for the cut-out, now completed picture postcards 24. The support 12, the photographs 19 and the double-sided adhesive strip between them are cut to the correct size by means of the cutting device 6. Through feeding of the double-sided adhesive strip with oversize in the widthwise direction (transverse to the direction of conveyance), even after cutting to size of the picture postcards, sufficiently material will remain being engaged by the advancement member 10 and realises advancement of the double-sided adhesive strip 7. Preferably also the support as well as the photographs are supplied with a determined oversize.

The invention is not limited to the embodiment described above, but can be varied in many ways within the scope of the invention.

The supports 12 may be provided as shown, as a stack of supports, or may be provided in strip form.

In addition to the above-described conveyance means, conveyance means which are not shown in any further detail can be present between the second function element 5 and the cutting device 6. These conveyance means can group the edge of the strip of double-sided bonding material and carry out the above-described intermittent movement in the lengthwise direction. In order to avoid problems with regard to the gripping means remaining adhering to the strip and problems during the cutting at 6, it is possible, as shown in the drawing, to feed the protective film indicated by 8, which has been taken away, back again to the double-sided adhesive strip before the cutting step. This is important particularly if the picture or mounting is narrower than the width of the strip.

This is only one of many possible modifications which can be made to the above-described now preferred embodiment without going beyond the scope of the present invention.

I claim:

1. A process for production of a picture postcard, comprising the steps of:

a) providing a continuous web having a layer of adhesive on each surface thereof, and advancing said web intermittently;

b) adhering one of a picture layer and support layer to a first surface thereof;

c) adhering to other of said picture layer and said support layer to the opposite surface thereof, said picture layer and said support layer being in registry and forming a picture postcard unit; and d) cutting the picture postcard unit out of the web, wherein each said adhering step takes place at a different location spaced along said web, while said web is stopped.

2. A process according to claim 1, wherein the opposite surface of said continuous web is provided with a protective film, wherein one of said picture layer and support layer is adhered to said first surface with said film in place, and wherein said film is removed before application of the other of said picture layer and support layer to said opposite surface.

3. A process according to claim 2, wherein said protective film is temporarily reapplied to said web after the other of said picture layer and support layer is adhered.

4. A process according to claim 1 or 2, wherein said web has a greater width than said picture layer and said support layer, thereby creating, after the adhering steps, an uncovered web portion at each edge thereof, said edge portions remaining as part of the web after said cutting step.

* * * * *